April 21, 1970 B. B. BEEKEN 3,507,295

FLUID AMPLIFIER

Filed Aug. 16, 1967 2 Sheets-Sheet 1

INVENTOR.
BASIL B. BEEKEN
BY
Albert W. Scribner
ATTORNEY

INVENTOR.
BASIL B. BEEKEN
BY
Albert W. Scribner
ATTORNEY

3,507,295
FLUID AMPLIFIER

Basil B. Beeken, New Haven, Conn., assignor to Pitney-Bowes, Inc., Stamford, Conn., a corporation of Delaware Filed Aug. 16, 1967, Ser. No. 661,099
Int. Cl. F15c 1/08
U.S. Cl. 137—81.5 7 Claims

ABSTRACT OF THE DISCLOSURE

A wall attachment type fluid amplifier having two symmetrically opposed venting channels that are located adjacent the downstream end of the amplifier interaction chamber, each venting channel being provided with a flow restriction means. The walls defining the interaction chamber and the venting channels are very precisely shaped and relatively located geometrically so as to afford approximately 80 percent maximum pressure recovery factor.

This invention relates to an improved fluid amplifier, More particularly the invention relates to an improved fluid amplifier having a novel venting construction and arrangement that enables significant improvements in the operational efficiency of the amplifier to be obtained.

In practical use fluidic devices are incorporated in control and/or power circuits and when so used have operational loads imposed on the output line or lines thereof. It is important that the operational efficiency of these devices be as high as possible especially in applications where large numbers thereof are used or where relatively large quantities of fluid are used in the operation of a given circuit. For a given set of operating conditions any improvement in the efficiency of a fluid amplifier can result in a very significant decrease in the amount of fluid consumed, the fluid supply pressures required and/or the size of the pumping means necessary to supply fluid to the fluidic system.

The operational efficiency of a fluid amplifier is, in certain applications, determined by how high a pressure recovery factor is obtainable from the amplifier when the latter is operationally placed under a full load condition. The pressure recovery factor may be defined as the ratio of the maximum possible fluid impact pressure that can be developed by the fluid stream in an amplifier output line divided by the then existing fluid supply pressure to the amplifier. Most conventional type fluid amplifiers have pressure recovery factors of approximately 30 to 40 percent whereas a fluid amplifier constructed and arranged in accordance with the instant invention can have a pressure recovery factor as high as 75 to 80 percent. This very significant operational improvement is here obtained by correlating the shape and relative location of certain surfaces of the fluid conducting passages of the amplifier as will be described.

The principal object of the instant invention is to provide an improved fluid amplifier construction which affords a marked improvement in operational efficiency.

Another object of the invention is to provide an improvide fluid amplifier which is capable of operating so as to obtain a pressure recovery factor close to 80 percent.

Another object of the instant invention is to provide an improved fluid amplifier which will operate reliably over a wide range of fluid supply pressures.

A further object of the invention is to provide an improved fluid amplifier having an interaction chamber with at least one side wall that is effectively defined by a smooth arc which extends from one side of the amplifier throat to the outer side wall of the associated amplifier outlet channel and which is interrupted by a venting outlet channel having a particular location and configuration.

Another object of the invention is to provide an improved fluid amplifier having symmetrically arranged venting channels each of which is provided with a restriction means along a downstream portion thereof.

Other objects will become apparent as the disclosure progresses.

Figure 2:
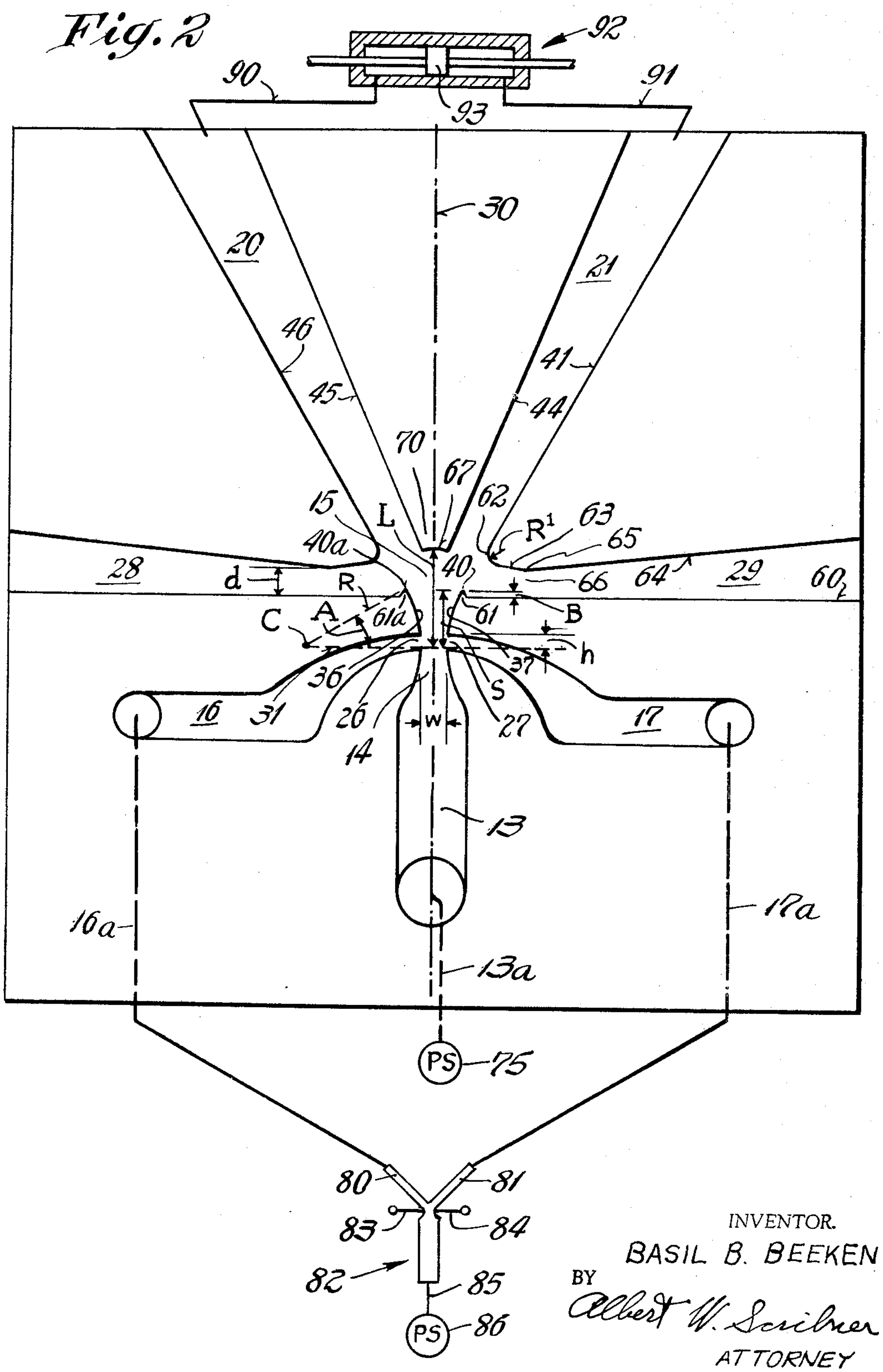
FIG. 2 is a plan view showing the profile of the fluid conducting passages of the instant amplifier and connections thereto wherein particular geometric relationships exist between certain elemental portions and/or surfaces of the amplifier.

The instant fluid amplifier may be manufactured by any suitable technique, however for low cost accurate production a plastic molding tape process is preferred. In this type of process the desired configurations for the fluid conducting passages of the amplifier are formed in the face of a main plate member which is then covered by another plate member and suitable sealing means so that the sandwiched composite unit then possesses the desired substantially rectangularly cross-sectional fluid conducting channels therethrough. This type of fabricating technique is well known and hence need not be further particularized here. The structural novelty of the instant invention involves the provision of a particular venting means for a fluid amplifier in combination with other critical operative surfaces of the amplifier: FIG. 2 illustrating the specific nature of this arrangement and configuration and how it is developed.

Figure 1:
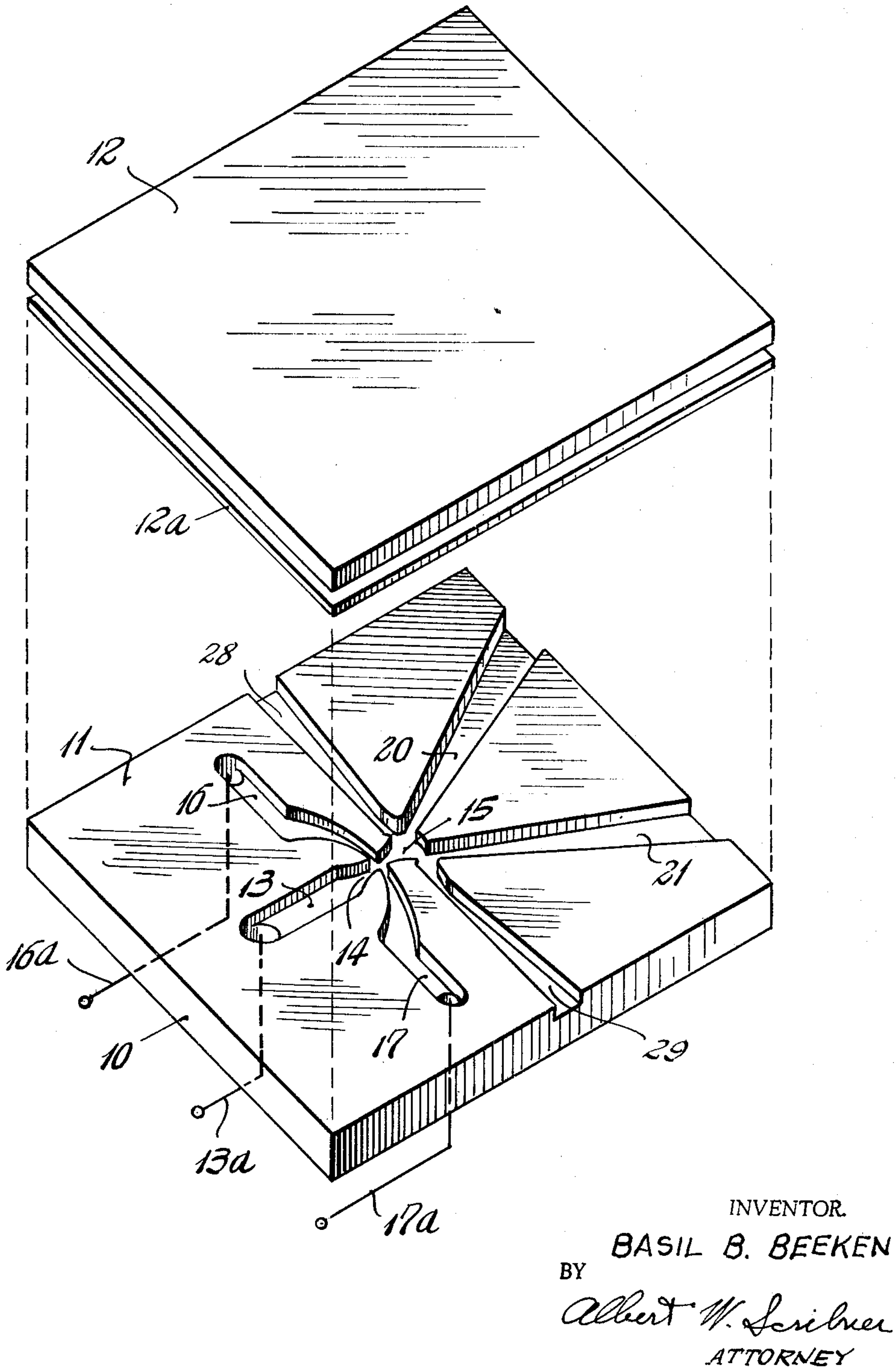
FIG. 1 is an exploded perspective view illustrating the overall construction of the instant fluid amplifier.

Referring to FIG. 1 the general laminar type construction for the present fluidic device is shown. Here the main plate 10 has an upper face 11 that is formed so as to define the various desired fluid conducting grooves therein. The said upper face 11 is covered with a sealing sheet 12*a* and a plate 12 which are secured to the main plate 10 by any suitable means such as riveting so as to close the upper edges of said grooves whereby the fluid conducting passages of the amplifier are completed and have substatnially rectangular cross sectional shapes. As illustrated in FIG. 1 the fluid conducting passages in the amplifier include a main supply input line or channel 13 which, through a throat 14 and an interaction chamber 15, communicates with a pair of divergent outlet lines or channels 20 and 21. A symmetrical pair of opposed control channels 16 and 17 communicate at ports 26 and 27 respectively with an upstream portion of said chamber 15. Fluid conduit lines diagrammatically illustrated at 13*a*, 16*a* and 17*a* of FIG. 1 are used to conduct fluid to said channels 13, 16 and 17 respectively. In operation fluid from a pressure source flows from the inlet channel 13 through throat 14 into the interaction chamber 15 and then out through either one of the outlet channels 20 or 21 depending on the then operative state of the amplifier. This general type of fluid amplifier construction and operation is well known in the art and need not be further particularized here.

Referring to FIG. 2 there is shown in a plan configuration for the profile of the fluid flow conducting surfaces of the instant amplifier and the geometric characteristics of this profile will become apparent from the following description of how the profile is generated. Unless otherwise stated it may be assumed that the various fluid conducting grooves or channels in the main plate 10, as illustrated in FIG. 2, have cross sectional shapes that are generally rectangular in nature, i.e., have substantially parallel vertical side walls and substantially horizontal flat bottom and top surface, and that all of said channels have substantially the same vertical depth. It may also be assumed that the center line 30 constitutes an axis of symmetry for the contouring and the arrangement of the various hereinafter discussed fluid conducting passages of the present amplifier. The cover plate 12 and sealing sheet 12a have been omitted in FIG. 2 for the purpose of clarity in the description of the geometry of the amplifier channel configuration. The venting channels 28, 29 respectively communicate with the convex arcuate side wall surfaces of the amplifier interaction chamber, each such convex arcuate surface blending smoothly at either end thereof with the side walls defining the associated side of the said throat 14 and the related outlet channel of the amplifier. The particular locations and shapes of the venting channels 28 and 29 in combination with the said convex side walls 36, 37 of the interaction chamber constitute the essence of the instant invention and such will now be discussed in detail.

The convex side walls 36 and 37 of the interaction chamber 15 of the instant amplifier are located and shaped in the same manner as that for the corresponding side walls described in my copending application Ser. No. 444,738 filed Apr. 4, 1965 now Patent No. 3,378,023. Briefly here the base line 31 is disposed perpendicular to said axis 30 and passes through the lower edges, as seen in FIG. 2, of the control ports 26, 27. A point C is located on said base line 31 such that its distance from axis 30 is between 4 and 6 times the width $w$ of the throat of 14. Using point C as a center a circular arc is swung from the base line 31 at the side of throat 14 to a point 40a corresponding to the point 40: point 40a representing the point of tangency between a straight line extension of the outer side wall 46 of channel 20 and the circular arc defining the said side wall 36 of the interaction chamber 15. The said circular arc subtends an angle A of between 25 and 35 degrees. The preferred length for the radius of curvature R of said arc is approximately five times the throat width $w$, while the preferred value of angle A is approximately 30 degrees. The interaction chamber 15, the base line 31, point C, angle A, point 40, signal ports 26, 27 and the outlet channels 20 and 21 are located, shaped and/or arranged in a manner similar to those elements numbered the same respectively in said copending application, and if further details are needed or desired here reference may be made to said pending application. The longitudinal shape of the instant control channels 16 and 17 as the latter extend away from ports 26, 27 respectively have been altered here but this change is not significant to the instant invention.

The venting channels 28 and 29 are formed to substantially the same depth as the other channels formed in the lower plate 10 and are symmetrically shaped and arranged with respect to the longitudinal axis 30 of the instant amplifier. In that channels 28 and 29 are formed similarly, a detailed discussion of just one such channel will suffice here. The lower side wall 60 (as seen in FIG. 2), of channel 29 extends substantially perpendicular to the amplifier axis 30 throughout most of its length, the inner end thereof terminating with a very short inclined portion which intersects the said side wall 37 of the interaction chamber 15 at a point 40 which corresponds to the point 40 described in said copending application. This terminal inclined portion of wall 60 is provided so as to form a very short cusp 61 that is effectively offset by a distance B from the lower straight portion of said wall 60. The upper side wall (as seen in FIG. 2) of venting channel 29 is formed with an initial convex portion 62 which has a radius of curvature $R^1$ and extends tangentially from the outer side wall surface 41 of outlet channel 21 to the substantially straight side wall portion 63 of venting channel 29. The wall portion 63 extends convergently towards the opposed straight side wall 60 for a short distance and then merges with the side wall portion 64 which extends divergently away from said side wall 60. The point or region 65 where side wall portions 63 and 64 merge effectively defines, in combination with the opposed portion of wall 60, a slight restriction 66 in the venting channel 29; this restriction being located a considerable distance downstream (or to the right as seen in FIG. 2) from the inner end of the venting channel 29, and having an effective width $d$ as indicated in FIG. 2.

The dimension L from the base line 31 of the amplifier control ports 26, 27 to the concave recess wall 67 formed at the upstream end of the amplifier splitter 70 has a value of between 3 and 5 times the effective width $w$ of the throat 14 of the instant amplifier, the center of the radius of curvature for the wall 67 being located at the intersection of base line 31 and axis 30. The dimension S between said base line 31 and the tip of the cusps 61 and 61a is between 2 and 3 times the said throat width $w$, while the said dimension $d$ is between 1 and 1.5 times the throat width $w$ and the dimension $R^1$ is between .5 and 1.5 times the said throat width $w$. The preferable values for dimensions L, S, $d$ and $R^1$ are 4, 2.5, 1.25 and 1 times the throat width $w$ respectively; the width $w$ being the effective width of the throat 14 of the inlet channel 13 as illustrated in FIG. 2. In that the various lines or channels of the instant device are formed to substantially the same depth, the respective cross-sectional areas of said channels, restrictions or lines will be related in proportion to their respective effective widths as shown in the plan view of FIG. 2.

The inlet channel 13 of the instant fluid amplifier is adapted to be coupled by line 13a to a pressure source 75, FIG. 2, while the control channels 16 and 17 thereof are coupled by lines 16a and 17a respectively to the output lines 80 and 81 of any suitable type of bistable fluidic device 82; the device 82 having the usual two control lines 83 and 84 and being adapted to be operatively coupled by means of a line 85 to a pressure source 86. As will be apparent the bistable fluidic device 82 is adapted to apply a continuous control signal to either the control line 16 or the control line 17 of the instant amplifier. The two output lines 20 and 21 of the instant fluidic device may be connected by lines 90 and 91 respectively to the opposite ends of a duplex type fluid motor 92 so that when the fluid motor piston 93 is moved to its extreme right- and left-hand positions the corresponding operative output line 20 or 21 will be "dead-ended" or 100% loaded; the then exhausted side of motor 92 venting through the associated one of said venting channels 28 or 29.

The instant fluidic device has two modes of operation and in that these modes are similar a detailed discussion of only one thereof will suffice here. Let it be assumed that the bistable control amplifier 82 is operating so as to supply a continuous control signal to control line 16 of the instant fluidic device. Such a signal will cause the main fluid stream flowing from pressure supply 75 through inlet line 13 and throat 14 to be deflected to the right, FIG. 2, and, in accordance with the wall attachment phenomenon, to follow along the side wall 37 of the interaction chamber 15. Thereafter this deflected main stream will flow through the output line 21 and into the right-hand end of fluid motor 92 so as to cause the piston 93 to move to its extreme left-hand position, the fluid exhausting from the left end of fluid motor 92 flowing back through lines 90 and 20 and out through the venting channel 28. With the piston 93 in its said extreme left-hand position the output line 21 of the instant fluidic device will be "dead-ended" or 100 percent loaded. Under these conditions the fluid flow through the exhaust channel 29 will increase over that normally taking place while the piston 93 is moving to the left; this normal and increased fluid flow through the exhaust channel 29 occurring while a high impact pressure is being generated in the said output line 21. The vent restriction 66 is located far enough downstream from the inner end of channel 29 so that no crowding of or substantial interference with the fluid flowing through output line 21 is generated by the fluid exhausting through said channel 29. Further the provision of the convex wall portion 62 at the inner end of the venting channel 20 reduces "noise" in the flow system.

I claim:

1. A fluidic device: comprising
a main body,
said main body having an inlet channel having a throat, an interaction chamber, a pair of outlet channels and at least one control channel formed therein;
the side walls of said interaction chamber being defined by substantially circular convex arcs having their centers of curvature located on a base line passing perpendicularly through the effective throat of said inlet line;
said main body being provided with a pair of venting channels therein that have inner ends that respectively communicate with opposite sides of said interaction chamber, each of the said venting channels defining therein a slight flow restriction located downstream along the venting flow path from said inner ends;
said interaction chamber having an effective length between three and five times the effective width of said throat of said inlet channel;
said convex arcs having radii of curvature between four and six times the effective width of said throat of said inlet channel;
said restrictions each having an effective cross-sectional area that is between one and one and a half times the effective cross-sectional area of said throat of said inlet channel; and
wherein the effective longitudinal distance between said throat of said inlet channel and said venting channels is between two and three times the effective width of said throat of said inlet channel.

2. Apparatus as defined by claim 1 wherein the effective length of said interaction chamber is substantially four times the effective width of said throat of said input channel.

3. Apparatus as defined by claim 1 wherein the effective cross-sectional area of each of said restrictions is substantially 1.25 times the effective cross-sectional area of said throat of said inlet channel.

4. Apparatus as defined by claim 1 wherein each of said radii of curvature is substantially five times the effective width of said throat of said inlet channel.

5. Apparatus as defined by claim 1 wherein said longitudinal distance between said effective throat of said inlet channel and said venting channels is substantially two and one half times the effective width of said throat of said inlet channel.

6. Apparatus as defined by claim 1 additionally comprising means for supplying a continuous biasing signal to said control channel.

7. Apparatus as defined by claim 1 wherein said main body is provided with a pair of control channels that communicate with opposite sides of said interaction chamber; and biasing means for alternately supplying continuous biasing signals to said control channels.

References Cited

UNITED STATES PATENTS

| | | | |
|---|---|---|---|
| 3,181,546 | 5/1965 | Boothe | 137—81.5 |
| 3,225,780 | 12/1965 | Warren et al. | 137—81.5 |
| 3,232,533 | 2/1966 | Boothe | 137—81.5 X |
| 3,338,515 | 8/1967 | Dexter | 137—81.5 X |

M. CARY NELSON, Primary Examiner
W. R. CLINE, Assistant Examiner

UNITED STATES PATENT OFFICE
CERTIFICATE OF CORRECTION

Patent No. 3,507,295 Dated April 21, 1970

Inventor(s) Basil B. Beeken

It is certified that error appears in the above-identified patent and that said Letters Patent are hereby corrected as shown below:

As a last paragraph before the claims, please insert the following:

---The shaping and arranging of the fluid conducting channels of the instant amplifier as above described enables approximately an 80 percent pressure recovery to be obtained in the "dead-ended" or fully loaded output line 21, such thereby generating a relatively high static fluid pressures in the right-hand end of the fluid motor 92. Similar high static pressures may be generated in the left end of fluid motor 92 when a continuous control signal is applied by amplifier 82 to said control line 17 so as to cause the main fluid stream of the instant fluidic device to shift to the left, FIG. 2, and to flow through the output line 20.---

(This paragraph appeared in the Specification as filed.)

SIGNED AND SEALED
DEC 29 1970

(SEAL)
Attest:

Edward M. Fletcher, Jr.
Attesting Officer

WILLIAM E. SCHUYLER, JR.
Commissioner of Patents